Feb. 28, 1939. T. S. ELLIOTT, SR 2,148,451
MEANS FOR DISPENSING ICE CREAM AND THE LIKE
Filed Jan. 27, 1938   2 Sheets-Sheet 1
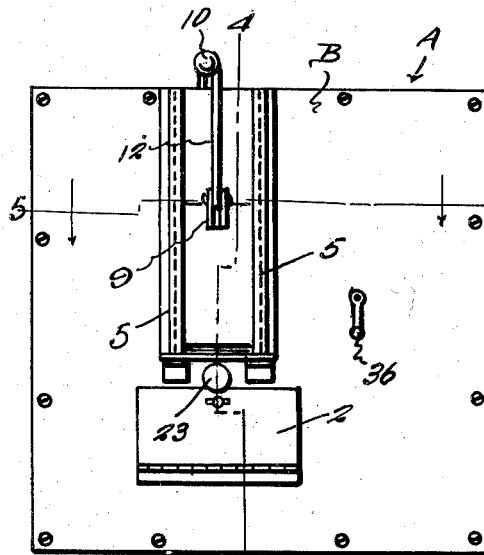
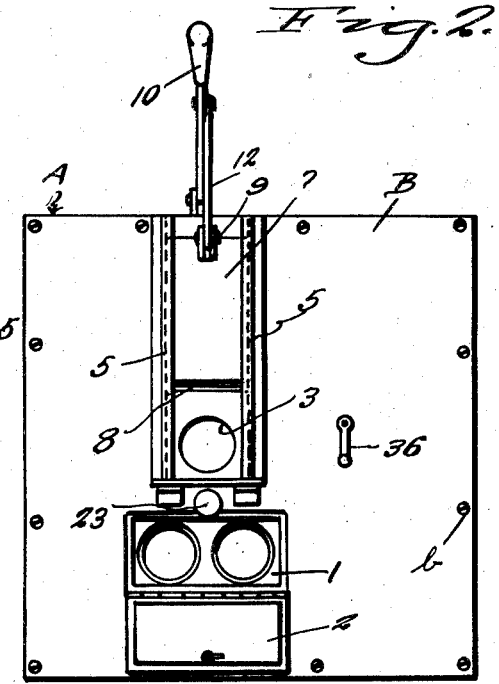
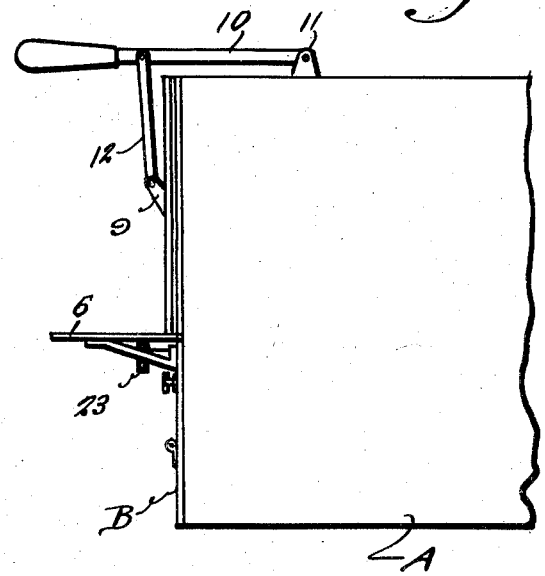
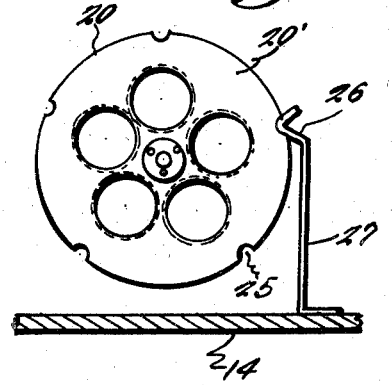
Inventor
Thomas S. Elliott, Sr.
By Clarence A. O'Brien
Hyman Berman
Attorneys Feb. 28, 1939. T. S. ELLIOTT, SR 2,148,451
MEANS FOR DISPENSING ICE CREAM AND THE LIKE
Filed Jan. 27, 1938 2 Sheets-Sheet 2
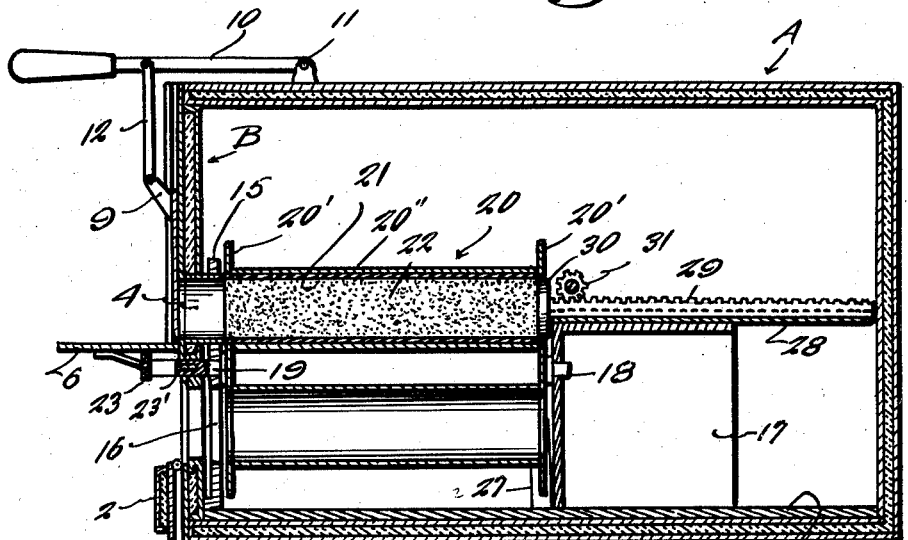
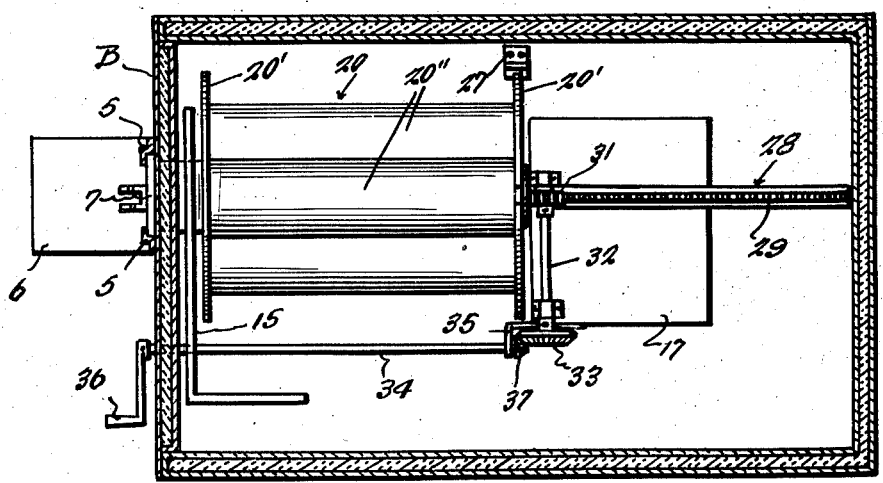
Inventor
Thomas S. Elliott, Sr.
By
Attorneys Patented Feb. 28, 1939

2,148,451

UNITED STATES PATENT OFFICE 2,148,451

MEANS FOR DISPENSING ICE CREAM AND THE LIKE

Thomas S. Elliott, Sr., Norfolk, Va., assignor to The Elliott Improvement Company, Inc., Norfolk, Va.

Application January 27, 1938, Serial No. 187,298

4 Claims. (Cl. 107—21)

This invention relates to means for dispensing ice cream and the like, the general object of the invention being to provide a refrigerator of any suitable type with a movable carrier into which sleeves of suitable material containing the frozen material are placed, with means whereby predetermined amounts of the material in each sleeve can be projected through a hole in the refrigerator and then the projecting part cut off so that the customer receives the correct amount of material and the material is delivered without exposing the material remaining in the refrigerator to the outside air and dust or dirt. Thus the material is kept in a sanitary condition and with practically no loss of material such as when a dipper is used to remove the material from a can which breaks the air pockets in the material.

Another object of the invention is to provide means whereby the carrier can be refilled through a small door in a part of the refrigerator and the material projected in predetermined amounts from the refrigerator and cut off are all from the exterior of the refrigerator.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a front view of a refrigerator having the invention applied thereto, this view showing the combined door and knife in closed position.

Figure 2 is a similar view but with the knife and door in raised position.

Figure 3 is a fragmentary side view of the front portion of the refrigerator.

Figure 4 is a section on the line 4—4 of Figure 1.

Figure 5 is a section on the line 5—5 of Figure 1.

Figure 6 is a view of the front end of the carrier and showing the detent means for yieldingly holding the same in adjusted position.

Figure 7 is a view of a sleeve containing the ice cream or other frozen material.

In these drawings the letter A indicates a refrigerator of any suitable type though the drawings show it as formed with double walls having insulation therebetween and the front end of the refrigerator is closed by a removable panel B which is also formed with double walls having insulation between them and the edges of this panel are detachably conected with the body of the refrigerator, such as by means of the screws $b$. A rectangular-shaped opening 1 is formed in the panel and is adapted to be closed by a hinged door 2 also formed of double walls with insulation between the walls and above this opening a circular opening 3 is formed in the panel in which fits a short tubular part 4 which is suitably connected at its outer end with the outer wall of the panel with its inner end projecting from the inner wall of the panel. Vertically arranged guideways 5 are formed on the outer face of the panel with the opening 3 opening out between the lower ends of these guideways and a shelf 6 extends forwardly from the panel at the lower end of the guideways and slightly below the opening 3. A sliding door 7 operates in the guideways and has its lower end beveled to provide a knife or cutting edge 8 which cuts material projecting through the opening 3. A projection 9 extends from the front face of the door adjacent its upper end and a handle member 10 is pivotally connected to the top of the refrigerator adjacent the front end thereof as shown at 11, this member being connected by a link 12 with the projection 9 so that by manipulating the handle member or lever 10 the door can be raised and lowered. When in lowered position it will close the opening 3.

A base 14 is adapted to be placed in the refrigerator after the panel has been removed, said base resting on the bottom of the refrigerator and at the front end the base has an upstanding part 15 having a hole in its upper portion through which the tubular part 4 extends and an opening 16 in its lower part which registers with the door opening 1. A box-like member 17 is carried by the base 14 adjacent the rear thereof and the front of this member 17 and the member 15 have openings therein for receiving the pintles 18 and 19 formed at the ends of a drum 20 so that the drum is rotatably supported by said parts 15 and 17. The drum includes a pair of disks 20' and a plurality of cylinders 20'' which have their ends passing in holes formed in the disks so that said cylinders open out through the disks. The drum is so formed and arranged that in certain positions thereof one of the cylinders will be in alignment with the tubular part 4 and either one or more of the cylinders will be exposed through the openings 1 and 16 when the door 2 is open. Thus by opening the door the sleeves 21 of any suitable material and containing the ice cream 22 or other frozen material can be placed in the cylinders of the drum, said drum being rotated to bring the cylinders to the door opening by means of a knob 22' having its inner part or shank passing into a hole in the panel below the shelf, said inner end being reduced and threaded as shown at 23 to engage a threaded socket in the front pintle 19 of the drum. Thus by turning the knob the drum can be rotated to bring the cylinders in registry with the door opening so that they can be charged with the sleeves 21 and to bring one of the cylinders in register with the opening 3. The tubular part 4 is of substantially the same size as a sleeve 21 so that the ends of the sleeve will abut the inner end of the tubular part to prevent the sleeve from being moved as the frozen material is being pushed from the sleeve through the tubular part 4. One of the disks 20' of the drum is formed with the notches 25 for receiving the V-shaped end 26 of a spring upright 27 carried by the base 14, these parts acting to yieldingly hold the drum in position with any one of the cylinders in register with the opening 3 or tubular member 4.

A channel guiding bar 28 is supported on the top of a member 17 and slidingly supports a rack bar 29 which has a plunger 30 at its front end for entering a sleeve 21 in the top cylinder of the drum so as to force the ice cream from the sleeve through the tubular part 4 and opening 3 when the rack is moved forwardly. The rack bar is moved forwardly by means of a toothed wheel 31 engaging the teeth of the rack bar and arranged on a shaft 32 journaled on the top of the member 17 and having a beveled gear 33 at that end opposite the end of which the toothed wheel 31 is connected. A shaft 34 passes through an opening in the panel and through a bracket 35 attached to the member 17 and has a crank handle 36 at its outer end and a small beveled gear 37 on its inner end for engaging the gear 33. Thus by rotating the shaft by the handle 36 the gears 33 and 37 will rotate the shaft 32 which will cause the rack bar to move forwardly under the action of the gear 31 and thus the plunger 30 will push some of the ice cream from the sleeve through the tubular member 4 and opening 3. Then by pushing downwardly on the handle member 10 the door will move downwardly so that its cutting lower edge will cut the ice cream which is projected from the device and then this cut portion can be picked up from the shelf 6.

By using different sizes of gears 37 the plunger can be made to push different amounts of the ice cream from the device. For instance, a certain size gear 37 would be connected with the shaft 34 when it was desired to dispense a pint of ice cream each time the handle 36 made a complete rotation. Then if a quart of ice cream was to be dispensed each time the handle 36 made a complete rotation another gear 37 would be substituted for the previously used gear and the proportions of the gears 37 and 33 would be such that the plunger would move forwardly a distance equal to the distance required to project a quart of ice cream of the material from the tubular member 4 so that this amount will be cut off when the door is lowered.

When all the material in one sleeve has been discharged then the handle 36 is turned in a reverse direction so as to retract the plunger and then the knob is turned to bring a new cylinder and filled sleeve therein up through the opening 3 and as it will be seen from Figure 6 as soon as this new sleeve comes into register with the tubular part 4 the detent 26 will snap into a notch and thus yieldingly hold the parts in this position. The empty sleeves are removed through the door opening 1 and the filled sleeves are passed through this door opening into the empty cylinders of the drum. Of course, after the door has been lowered to cut a part of the ice cream from the body thereof the door should be permitted to remain in closed position until a demand is made for another quantity of the cream.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. Means for dispensing frozen material such as ice cream comprising a refrigerator having a discharge opening in one wall thereof and a door covered opening in said wall, a movable member in the refrigerator for receiving sleeves containing the material, said sleeves being introduced through the door covering opening, means actuated from the exterior of the refrigerator for forcing desired amounts of the material from each sleeve through the discharge opening, means actuating from the exterior of the refrigerator for adjusting the movable member to bring a desired sleeve opposite the discharge opening, a combined closure and knife for severing the projecting part of the material from the rest of the material and for closing the discharge opening.

2. Means for vending frozen material such as ice cream comprising a refrigerator having a discharge opening in one wall thereof, a drum rotatably arranged in the refrigerator and including cylinders for containing the material, means for rotating the drum from the exterior of the refrigerator to bring a cylinder in alignment with the discharge opening, plunger means for forcing the material from the cylinder through the discharge opening, means for actuating the plunger means from the exterior of the refrigerator and a combined knife and closure for cutting the material projecting from the discharge opening and for closing said opening.

3. In a device of the class described, a refrigerator having a discharge opening therein and a filling opening therein, a door for closing the last-mentioned opening, a horizontally arranged drum rotatably mounted in the refrigerator and including a plurality of cylinders, adapted to receive sleeves containing frozen material to be placed in the cylinders through the filling opening, means for rotating the drum from the exterior of the refrigerator to bring a cylinder opposite the first-mentioned opening, plunger means for pressing the material from a sleeve in a cylinder through the first-mentioned opening, means for operating the plunger means from the exterior of the refrigerator, and a manually operated sliding door for closing the first-mentioned opening and having a beveled edge for cutting the material projecting from the opening when the door is moved to closed position.

4. In a device of the class described, a refrigerator casing having an opening therein, a sliding door for closing the opening and having a beveled edge for cutting material projecting from the opening, containers, means actuated from the exterior of the refrigerator positioning the containers in succession in alignment with the opening, plunger means for forcing the material from the containers through the opening, said means including a rack having a plunger head, a shaft having a toothed wheel engaging the rack, a shaft having one end projecting from the refrigerator, a handle on said head and gearing for operating the first-mentioned shaft from the second shaft, some of the gearing being interchangeable for varying the amount of material projected through the opening at each operation of the second shaft by its handle.

THOMAS S. ELLIOTT, Sr.